United States Patent [19]

Simmons

[11] Patent Number: 5,582,365
[45] Date of Patent: Dec. 10, 1996

[54] FOREIGN OBJECT DEFLECTOR FOR PROTECTING EQUIPMENT ON THE LOWER FUSELAGE OF AN AIRCRAFT

[75] Inventor: John S. Simmons, Riverside, Calif.

[73] Assignee: Lockheed Corporation, Bethesda, Md.

[21] Appl. No.: 324,086

[22] Filed: Oct. 14, 1994

[51] Int. Cl.$^6$ .................................................. B64C 7/00
[52] U.S. Cl. ........................................................ 244/130
[58] Field of Search ................................. 244/121, 130, 244/113, 213, 214, 215, 102 R, 137.1

[56] References Cited

U.S. PATENT DOCUMENTS

| | | |
|---|---|---|
| 1,287,910 | 12/1918 | De Rosa . |
| 1,564,354 | 12/1925 | Junkers . |
| 1,701,491 | 2/1929 | Casey . |
| 1,773,521 | 8/1930 | Davis ........................... 244/113 |
| 2,108,289 | 2/1938 | Laddon . |
| 2,164,531 | 7/1939 | Lee . |
| 2,400,388 | 5/1946 | Campbell ....................... 244/113 |
| 2,421,870 | 6/1947 | Dornier et al. .................. 244/113 |
| 2,461,967 | 2/1949 | Devlin et al. ................... 244/113 |
| 2,814,454 | 11/1957 | Atkins et al. . |
| 2,823,072 | 2/1958 | Podolan . |
| 3,215,377 | 11/1965 | Jarecki . |
| 4,697,764 | 10/1987 | Hardy et al. ................... 244/137.4 |

FOREIGN PATENT DOCUMENTS

| | | | |
|---|---|---|---|
| 716116 | 1/1942 | Germany ........................... | 244/121 |
| 555700 | 9/1943 | United Kingdom . | |
| 604013 | 6/1948 | United Kingdom . | |
| 606875 | 7/1948 | United Kingdom . | |

*Primary Examiner*—Galen L. Barefoot
*Attorney, Agent, or Firm*—Louis L. Dachs

[57] ABSTRACT

A foreign object deflector for installation on the lower fuselage of an aircraft forward of equipment, such as antennas and radomes, which are to be protected by the deflector. During takeoff and landing, aircraft landing gear kick up various foreign objects, such as rocks, dirt and debris, which can damage or destroy the relatively fragile equipment. However, the foreign object deflector of the present invention deflects these foreign objects away from the equipment. Then, once the takeoff or landing is completed, the foreign object deflector is retracted and latched in place to minimize drag.

8 Claims, 7 Drawing Sheets

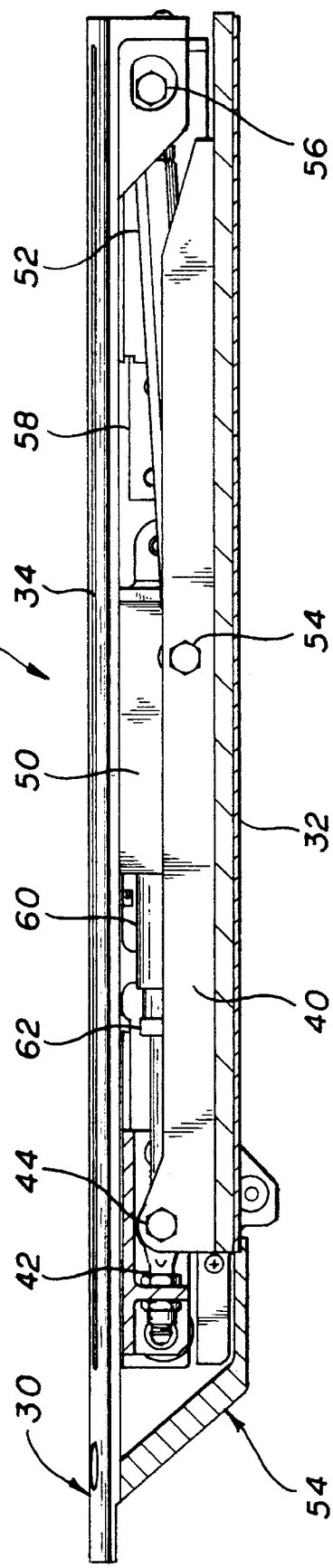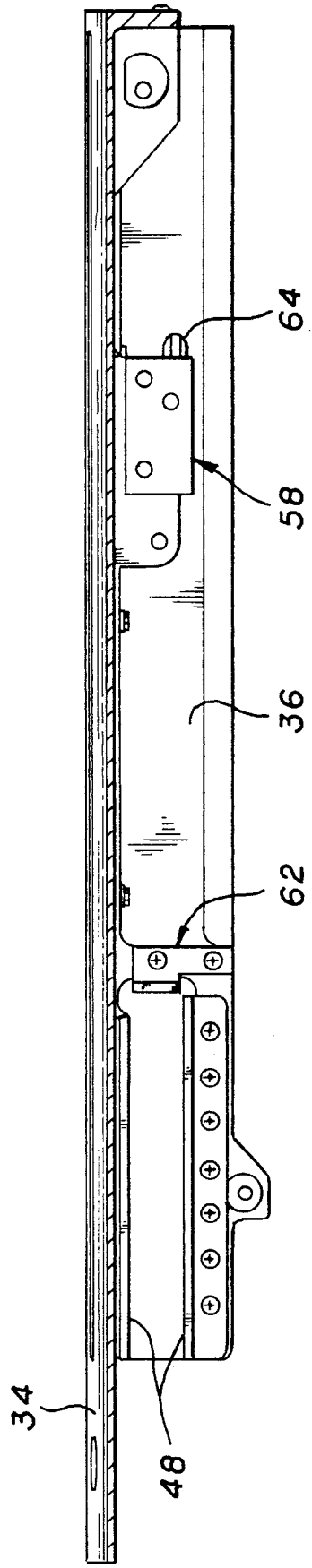

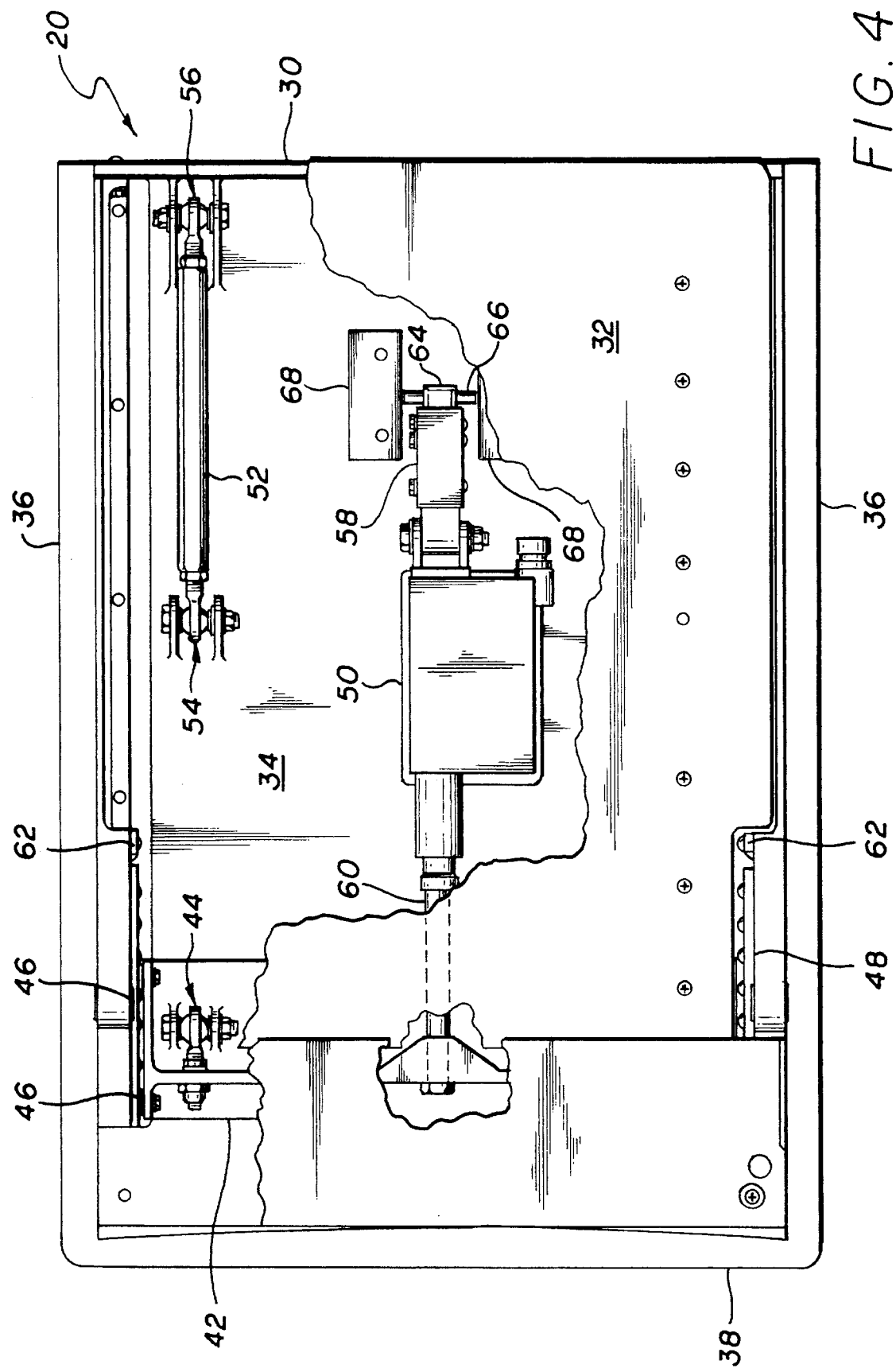

FOREIGN OBJECT DEFLECTOR FOR PROTECTING EQUIPMENT ON THE LOWER FUSELAGE OF AN AIRCRAFT

FIELD OF THE INVENTION

The present invention relates generally to foreign object deflectors for aircraft and, more particularly, to a foreign object deflector for protecting equipment on the lower fuselage of an aircraft from strike damage caused by foreign objects which are kicked up during takeoff and landing.

BACKGROUND OF THE INVENTION

Various devices have been proposed for protecting aircraft and pilots from hazards encountered during flight. For example, to protect military aircraft and pilots from ground fire, various types of aircraft armor have been suggested, as disclosed in U.S. Pat. Nos. 1,287,910 to De Rosa and 1,564,354 to Junkers. To protect aircraft windshields from ice, snow and insects, several types of windshield deflectors have been proposed, as disclosed in U.S. Pat. Nos. 2,823,072 to Podolan and 3,215,377 to Jarecki. To protect jet engines from ingesting foreign objects kicked up during takeoff and landing, an intake screen covering the engine intake during takeoff and landing has been suggested, as disclosed in U.S. Pat. No. 2,814,454 to Atkins et al.

Various aircraft equipment, such as antennas and radomes, are located on the lower fuselage of an aircraft aft of the landing gear. This equipment is subject to strike damage by foreign objects, such as rocks, dirt, and debris, which are kicked up by the landing gear during takeoff and landing. Accordingly, there has been a need for a foreign object deflector to protect against this type of strike damage.

OBJECTS AND SUMMARY OF THE INVENTION

It is therefore an object of the present invention to provide a foreign object deflector that protects equipment located on the lower fuselage of an aircraft from strike damage caused by foreign objects kicked up during takeoff and landing.

It is another object of the present invention to provide a foreign object deflector having a modular design for ease of installation.

It is another object of the present invention to provide a foreign object deflector that requires only minimum aircraft modification for installation.

It is another object of the present invention to provide a foreign object deflector that can be easily adapted to various airframe types and sizes.

It is another object of the present invention to provide a foreign object deflector that has a low external profile when retracted to minimize drag and interference with the lower fuselage equipment.

It is another object of the present invention to provide a foreign object deflector that is electrically/mechanically actuated to minimize modifications of existing aircraft systems.

It is another object of the present invention to provide a foreign object deflector that can be easily maintained.

It is another object of the present invention to provide a foreign object deflector that can be latched in the retracted position to prevent accidental deployment during flight.

These and other objects of the present invention are provided by a foreign object deflector which is installed on the lower fuselage of an aircraft forward of equipment to be protected, such as antennas and radomes. During takeoff and landing, the aircraft landing gear kick up various foreign objects, such as rocks, dirt and debris, which can damage or destroy the relatively fragile equipment. However, the foreign object deflector of the present invention deflects these foreign objects away from the equipment. Then, once the takeoff or landing is completed, the foreign object deflector is retracted and latched in place to minimize drag.

The foreign object deflector of the present invention includes a low profile housing and a deflector shield rotatably attached to the housing. The low profile housing includes an upper surface, two side walls, and a front fairing. The front fairing and low profile housing are designed to minimize drag when the deflector shield is retracted into the housing. The housing can be easily attached to the lower fuselage of the aircraft by conventional attachment techniques with minimum modification to the aircraft. When necessary, the foreign object deflector can be easily adapted for attachment at any location on the lower fuselage of the aircraft.

The upper surface of the deflector shield has support rails attached along either side of the shield. The forward ends of the support rails are rotatably attached to a carriage. The carriage has wheels for movement along a pair of carriage rails which are attached to the side walls of the housing. A carriage actuator moves the carriage back and forth along the carriage rails. The forward ends of a pair of deflector arms are rotatably attached to the support rails and the aft ends of the deflector arms are rotatably attached to the aft end of the housing. As the carriage is moved aft by the carriage actuator, the deflector arms cause the deflector shield to rotate down into the airstream of the aircraft, thus protecting the equipment during takeoff and landing.

It will be appreciated from the foregoing that the present invention represents a significant advance in the field of aircraft foreign object deflectors. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 3 is a cut-away side view of the foreign object deflector.

FIG. 4 is a partially cut-away bottom view of the foreign object deflector.

FIG. 5 is a cut-away side view of a housing of the foreign object deflector showing a carriage rail and a latch housing.

DETAILED DESCRIPTION OF THE INVENTION

Figure 1:
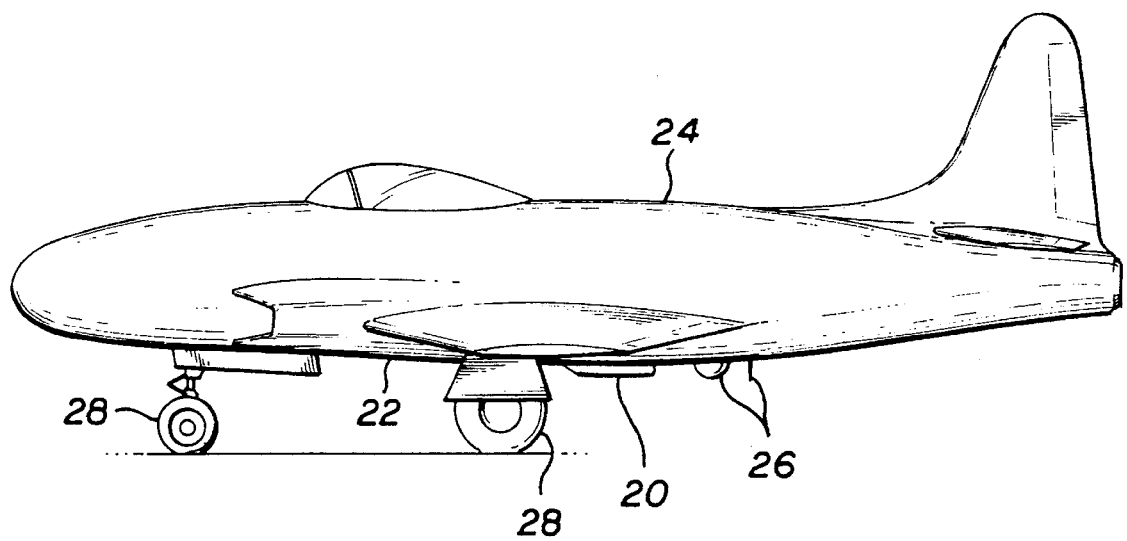
FIG. 1 is a side view of an aircraft having a foreign object deflector installed on its lower fuselage in accordance with the present invention.

As shown in FIG. 1, a foreign object deflector 20 in accordance with the present invention is installed on a lower fuselage 22 of an aircraft 24. The foreign object deflector 20 is installed forward of aircraft equipment 26, such as antennas and radomes, which are to be protected by the deflector 20. During takeoff and landing, aircraft landing gear 28 kick up various foreign objects, such as rocks, dirt and debris, which can damage or destroy the relatively fragile equipment 26. However, the foreign object deflector 20 of the present invention deflects these foreign objects away from the equipment 26. Then, once the takeoff or landing is completed, the foreign object deflector 20 is retracted and latched in place to minimize drag.

Figure 2:
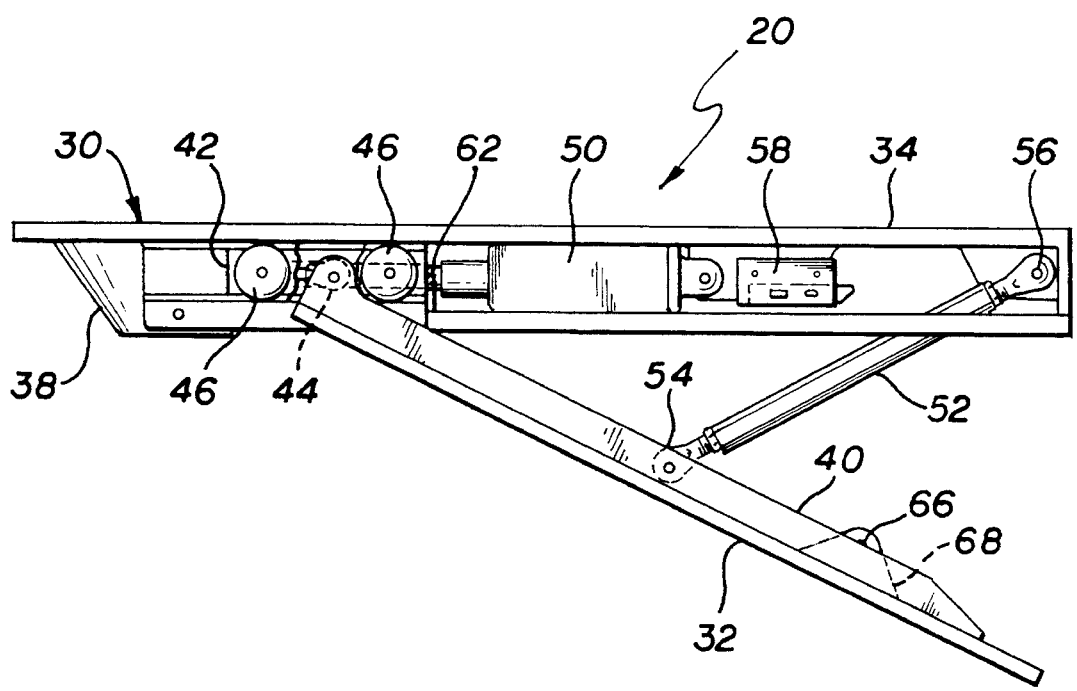
FIG. 2 is a side view of the foreign object deflector in a fully deployed position.

As shown in FIGS. 2–4, the foreign object deflector 20 of the present invention includes a low profile housing 30 and a deflector shield 32 rotatably attached to the housing 30. The low profile housing 30 includes an upper surface 34, two side walls 36, and a front fairing 38. The front fairing 38 and low profile housing 30 are designed to minimize drag when the deflector shield 32 is retracted into the housing 30. The housing 30 can be easily attached to the lower fuselage 22 of the aircraft 24 by conventional attachment techniques with minimum modification to the aircraft. When necessary, the foreign object deflector 20 can be easily adapted for attachment at any location on the lower fuselage of the aircraft.

The upper surface of the deflector shield 32 has support rails 40 attached along either side of the shield. The forward ends of the support rails 40 are rotatably attached to a carriage 42 by ball couplings 44. The carriage 42 has wheels 46 for movement along carriage rails 48, shown in FIG. 5, which are attached to the side walls 36 of the housing 30. A carriage actuator 50 moves the carriage 42 back and forth along the carriage rails 48. The forward ends of a pair of deflector arms 52 are rotatably attached to the support rails 40 at approximately their midpoints by ball couplings 54 and the aft ends of the deflector arms 52 are rotatably attached to the aft end of the housing 30 by ball couplings 56. As the carriage 42 is moved aft by the carriage actuator 50, the deflector arms 52 cause the deflector shield 32 to rotate down into the airstream of the aircraft 24, thus protecting the equipment 26 during takeoff and landing.

Figure 6:
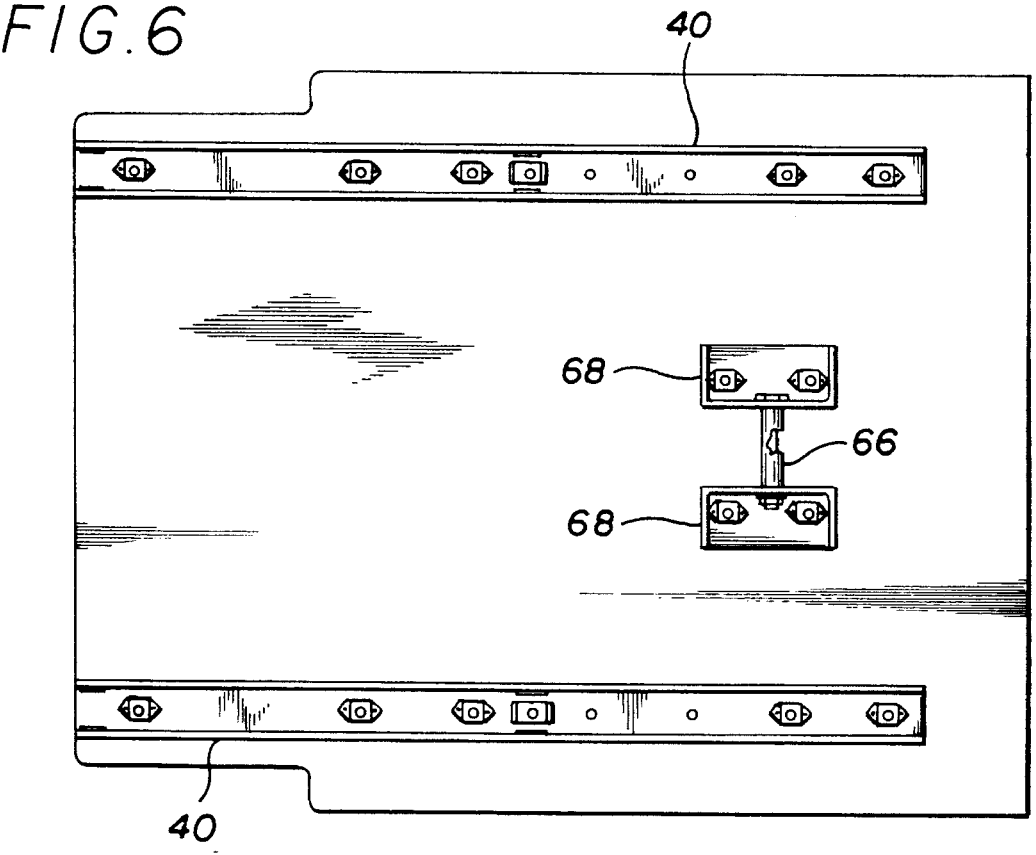
FIG. 6 is a top view of a deflector shield showing a latch pin and support rails.
Figure 7:
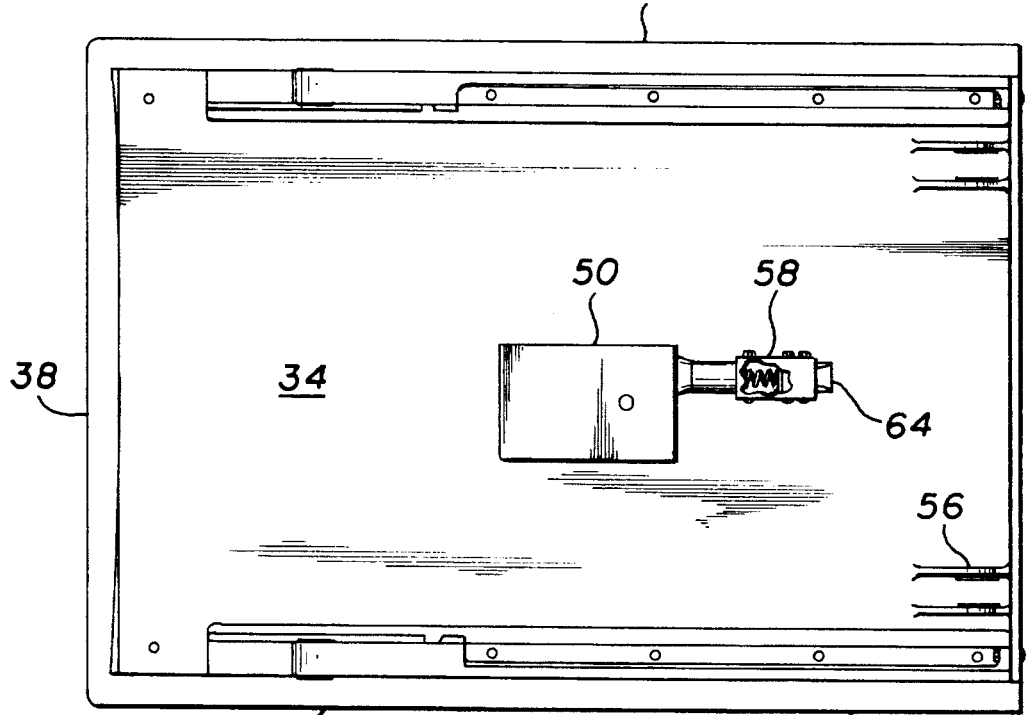
FIG. 7 is a bottom view of the housing showing the latch housing and a latch bolt.

As shown in FIG. 4, the base of the carriage actuator 50 is rotatably attached to one end of a latch housing 58. The latch housing 58 is attached to the upper surface 34 of the housing 30 along the centerline of the housing. The carriage actuator 50 has an actuator shaft 60 which is attached to the carriage 42. As shown in detail in FIG. 5, carriage stops 62 at the aft ends of the carriage rails 48 prevent movement of the carriage 42 beyond the fully deployed position of the deflector shield 32, thus preventing damage to the actuator 50. The other end of the latch housing 58 has a latch bolt 64 for engaging a latch pin 66 which is attached to the deflector shield 32. As shown in detail in FIGS. 6–7, the latch pin 66 is supported by latch pin brackets 68 which are attached to the deflector shield 32. The latch bolt 64 is preferably spring biased in the extended or locked position and is electrically actuated, preferably by a solenoid, by the pilot to release the deflector shield 32.

Figure 8:
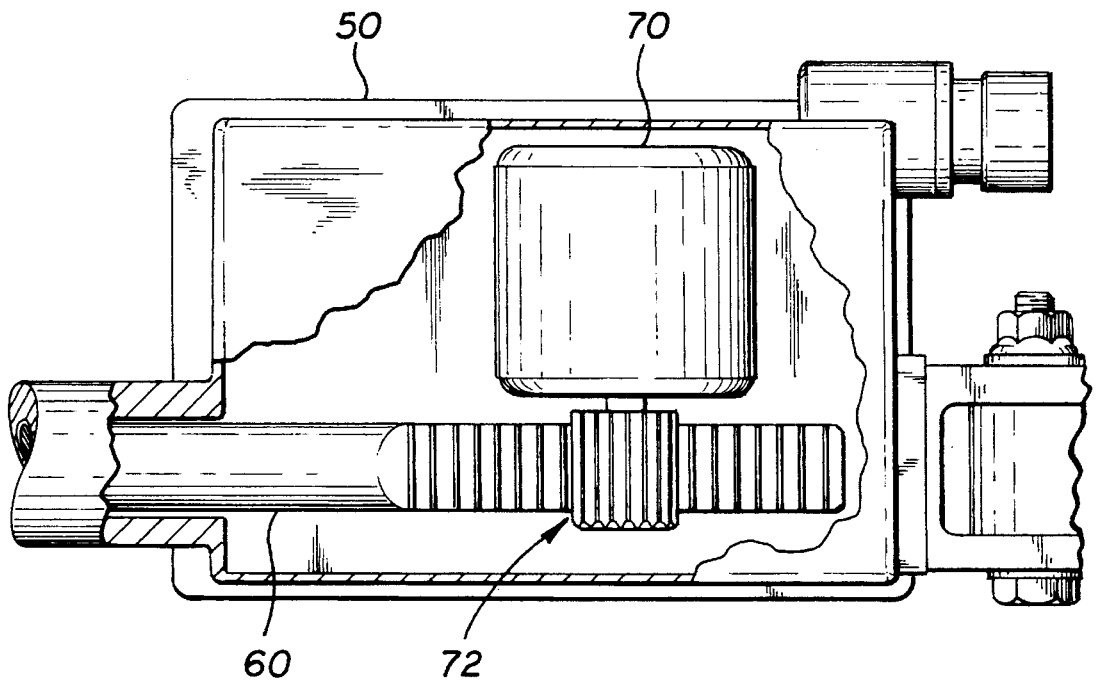
FIG. 8 is a top view of a carriage actuator.
Figure 9:
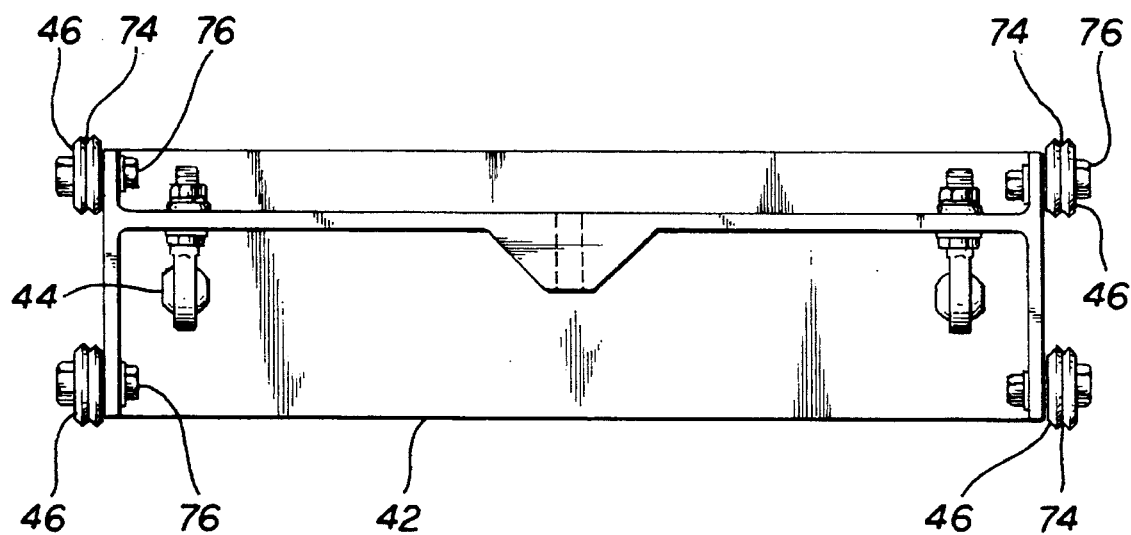
FIG. 9 is a top view of a carriage.
Figure 10:
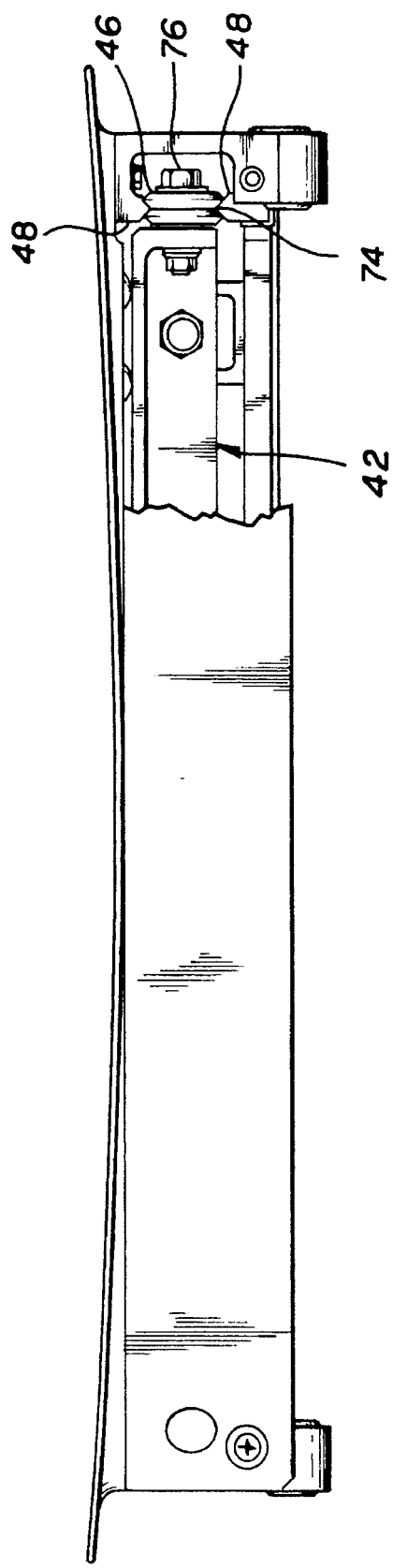
FIG. 10 is an end view of the foreign object deflector.

As shown in FIG. 8, the carriage actuator 50 includes an electric motor 70 and a rack and pinion gear system 72 connected between the electric motor 70 and the actuator shaft 60 for converting the rotational motion of the electric motor 70 into linear motion of the actuator shaft 60. The electric motor 70 is preferably a stepper motor to provide precise linear control of the actuator shaft 60. As shown in FIGS. 9–10, each carriage wheel 46 has an annular groove 74 around the outer portion of the wheel for engaging the carriage rail 48 to prevent lateral motion of the carriage 42. The wheels 46 are rotatably attached to the carriage 42 by bolts 76.

Figure 11:
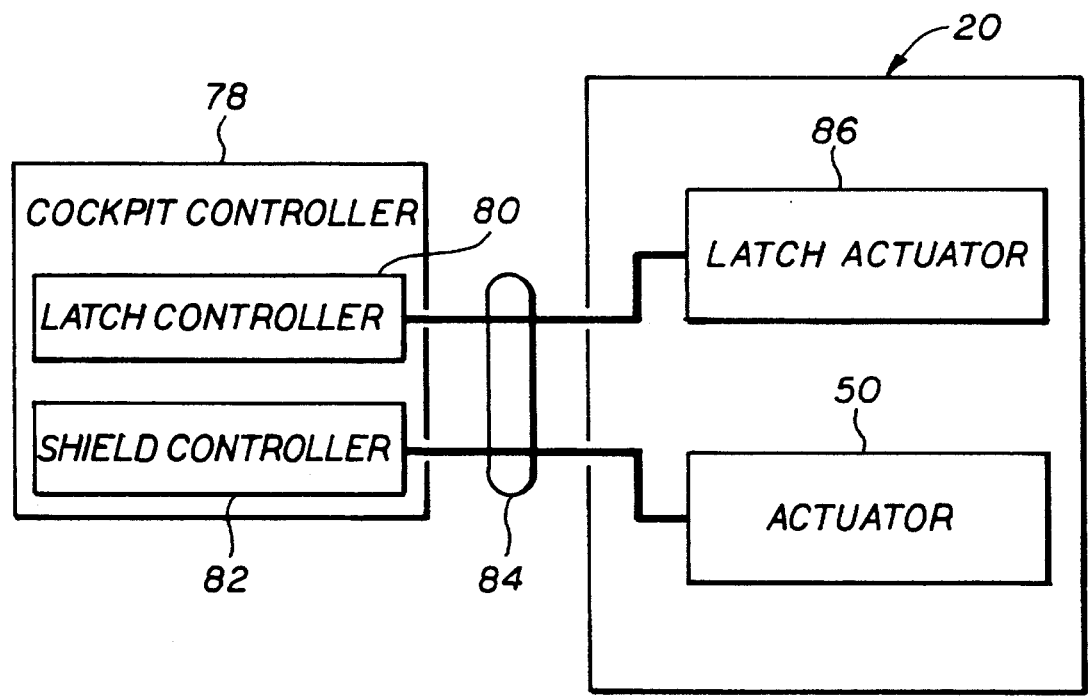
FIG. 11 is an electrical block diagram of a control system for operating the foreign object deflector.

As shown in FIG. 11, a cockpit controller 78 for operating the foreign object deflector 20 of the present invention includes a latch controller 80 and a shield controller 82. The latch controller 80 and the shield controller 82 are electrically connected by an electrical bus 84 to a latch actuator 86 and the carriage actuator 50, respectively. The single bus 84 minimizes any required alteration of the aircraft and minimizes interference with the other electronic systems of the aircraft. Position feedback signals are preferably generated by the latch actuator 86 and carriage actuator 50 to allow the pilot to monitor the operation of the foreign object deflector.

Prior to takeoff or landing, the pilot activates the latch controller 80 which sends a control signal to the latch actuator 86. The latch actuator 86 retracts the latch bolt 64, thus releasing the deflector shield 32 from its latched position. The pilot then activates the shield controller 82 which sends a control signal to the carriage actuator 50. The carriage actuator 50 moves the carriage 42 aft to deploy the deflector shield 32 down into the airstream of the aircraft 24. The deflector shield 32 can be deployed to various positions to provide protection of the equipment 26 for any type of runway surface. The carriage 42 preferably includes a locking mechanism to lock the carriage 42 to the carriage rails 48 at the various positions to prevent undue force on the carriage actuator 50 when the deflector shield 32 is deployed.

Figure 12:
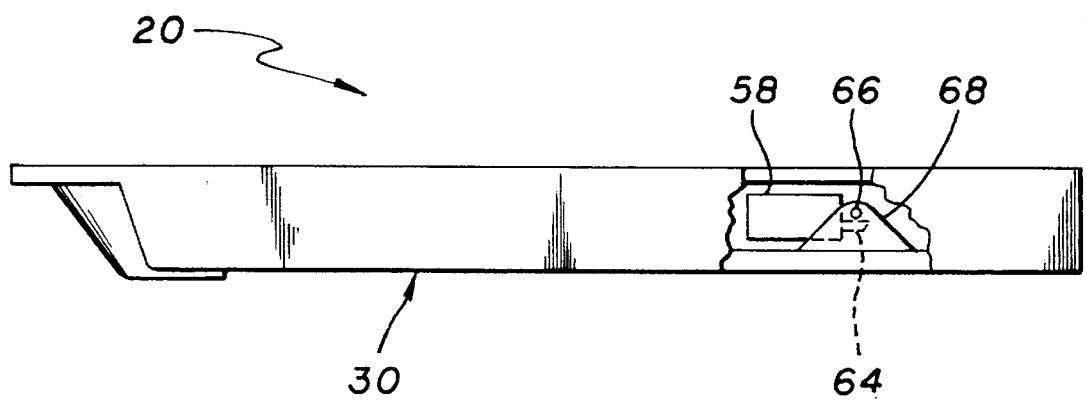
FIG. 12 is a side view of the foreign object deflector in a retracted position.
Figure 13:
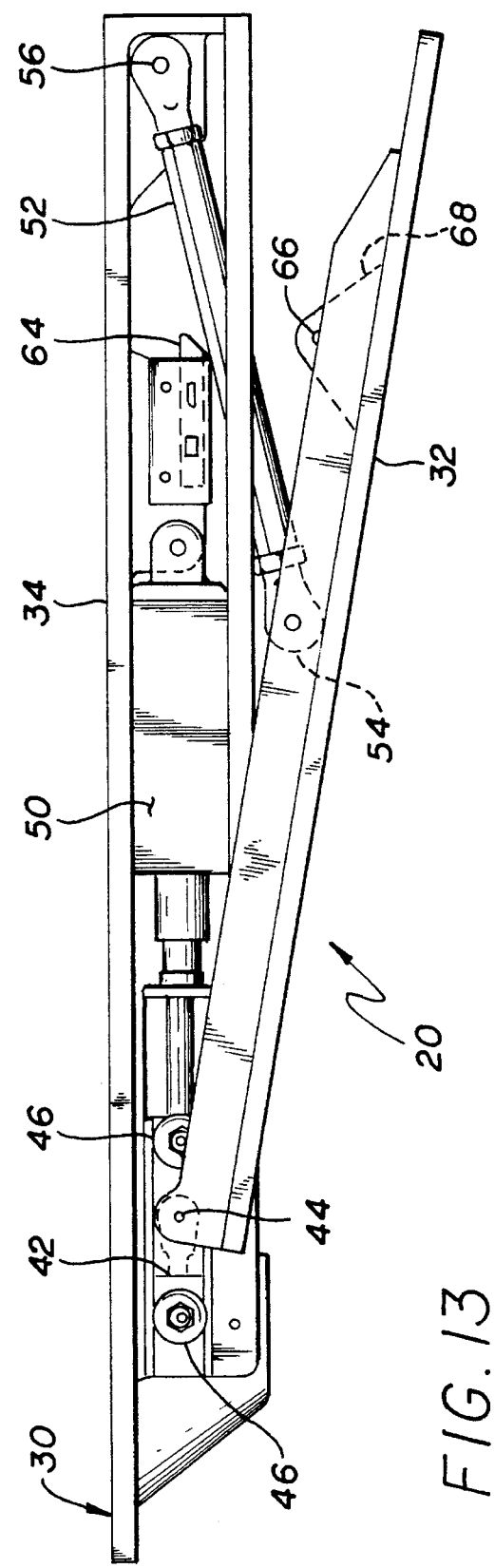
FIG. 13 is a side view of the foreign object deflector in a partially deployed position.

The operation of the foreign object deflector 20 is now described with reference to FIGS. 2, 12 and 13. The foreign object deflector 20 is shown in a fully retracted and latched position in FIG. 12. The latch pin 66 is engaged by the latch bolt 64 to prevent inadvertent deployment of the foreign object deflector 20 and to latch the foreign object deflector in a retracted position in the event of a loss of power. The foreign object deflector 20 is shown in a partially open position in FIG. 13. The latch pin 66 has been released by the latch bolt 64 and the carriage actuator 50 has been activated to move the carriage 42 partially aft. This aft movement of the carriage 42 causes the deflector shield 32 to rotate down into the airstream of the aircraft 24. The foreign object deflector 20 is shown in a fully deployed position in FIG. 2. When fully deployed, the carriage 42 abuts the carriage stops 62, preventing any further aft movement of the carriage 42. When the landing or takeoff is completed, the foreign object deflector 20 is retracted by the pilot and latched in place.

While the invention has been described with reference to specific preferred embodiments, it will be understood by those skilled in the art that various changes may be made and equivalents may be substituted for elements thereof without departing from the true spirit and scope of the invention.

I claim:

1. A foreign object deflector for protecting equipment on a lower fuselage of an aircraft from strike damage caused by foreign objects which are kicked up during takeoff and landing, comprising:

a housing for attachment to the lower fuselage of the aircraft forward of the equipment to be protected;

a carriage slidably attached to the housing;

a deflector shield having a forward and rear end, said shield rotatably attached to the carriage by said forward end;

an actuator mounted in the housing and attached to the carriage to provide linear movement of the carriage; and a pair of support arms rotatably attached to the housing and the deflector shield to cause the deflector shield to rotate down about it's said forward end into the air stream of the aircraft in response to the rearward linear movement of the carriage.

2. The foreign object deflector as set forth in claim 1, and further including latch means for latching the deflector shield in a retracted position in the housing.

3. The foreign object deflector as set forth in claim 2, wherein the latch means includes a latch pin attached to the deflector shield and a latch bolt attached to the housing for engaging the latch pin.

4. The foreign object deflector as set forth in claim 1, and further including carriage rails attached to the housing for supporting the carriage.

5. The foreign object deflector as set forth in claim 4, and further including carriage stop means attached to the carriage rails for limiting the aft movement of the carriage.

6. A foreign object deflector for protecting equipment on a lower fuselage of an aircraft from strike damage caused by foreign objects which are kicked up during takeoff and landing, comprising:

a housing for attachment to the lower fuselage of the aircraft forward of the equipment to be protected;

a pair of carriage rails attached to the housing;

a carriage mounted on wheels for linear movement along the carriage rails;

a deflector shield having a forward and rear end, said shield rotatably attached to the carriage by said forward end;

an actuator mounted in the housing and attached to the carriage to provide linear movement of the carriage;

latch means attached to the deflector shield and the housing for latching the deflector shield in a retracted position in the housing; and a pair of support arms rotatably attached to the housing and the deflector shield to cause the deflector shield to rotate down about its said forward end into the air stream of the aircraft in response to the rearward linear movement of the carriage.

7. The foreign object deflector as set forth in claim 6, wherein the latch means includes a latch pin attached to the deflector shield and a latch bolt attached to the housing for engaging the latch pin.

8. The foreign object deflector as set forth in claim 6, and further including carriage stop means attached to the carriage rails for limiting the aft movement of the carriage.

* * * * *